(12) United States Patent
Goel et al.

(10) Patent No.: US 10,049,650 B2
(45) Date of Patent: Aug. 14, 2018

(54) ULTRA-WIDE BAND (UWB) RADIO-BASED OBJECT SENSING

(71) Applicant: INTEL CORPORATION, Santa Clara, CA (US)

(72) Inventors: Manan Goel, Hillsboro, OR (US); Saurin Shah, Portland, OR (US); Lakshman Krishnamurthy, Portland, OR (US); Francis M. Tharappel, Portland, OR (US); Swarnendu Kar, Hillsboro, OR (US); Suresh V. Golwalkar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/275,252

(22) Filed: Sep. 23, 2016

(65) Prior Publication Data
US 2018/0090112 A1    Mar. 29, 2018

(51) Int. Cl.
*G10H 1/00* (2006.01)
*G06K 7/10* (2006.01)

(52) U.S. Cl.
CPC ....... *G10H 1/0008* (2013.01); *G06K 7/10306* (2013.01); *G06K 7/10425* (2013.01); *G10H 2220/461* (2013.01); *G10H 2230/281* (2013.01); *G10H 2250/435* (2013.01)

(58) Field of Classification Search
CPC .......... G10H 1/0008; G10H 2220/461; G10H 2230/281; G10H 2250/435; G06K 7/10306; G06K 7/10425
USPC .......................................................... 84/743
See application file for complete search history.

(56) References Cited

U.S. PATENT DOCUMENTS

| | | | | |
|---|---|---|---|---|
| 6,867,361 B2* | 3/2005 | Nishitani | ............ | G10H 1/0008 84/658 |
| 6,897,779 B2* | 5/2005 | Nishitani | ............ | G10H 1/0083 340/384.3 |
| 8,781,563 B2* | 7/2014 | Foo | ...................... | A61B 5/0205 128/903 |

(Continued)

FOREIGN PATENT DOCUMENTS

WO      2015114626 A1    8/2015

OTHER PUBLICATIONS

Kencl, L.,et al. and Pennock, S., et al "A System for Radio Tracking of Team-Sports Players," 6th International Conference on the Engineering of Sport, Jul. 11, 2006-Jul. 14, 2006.

(Continued)

*Primary Examiner* — David Warren
*Assistant Examiner* — Christina Schreiber
(74) *Attorney, Agent, or Firm* — Schwabe, Williamson & Wyatt, P.C.

(57) ABSTRACT

The present disclosure describes a number of embodiments related to devices, systems, and methods locating a an object using ultra-wide band (UWB) radio transceivers embedded in carpet or other flexible material that may be rolled up and moved to various locations. Once in a location, the carpet may be unrolled and the multiple embedded radio transceivers may receive a signal from a tag attached to the object sending UWB radio signals. Based on the signals received by the UWB radio transceivers, various processes including time-difference on arrival, time-of-flight, and phase shift may be used to determine the location or the movement of the object.

25 Claims, 11 Drawing Sheets

(56) References Cited

U.S. PATENT DOCUMENTS

| | | | | |
|---|---|---|---|---|
| 9,002,427 B2 * | 4/2015 | Tupin, Jr. | ............. | A61B 5/0507 600/407 |
| 9,629,340 B2 * | 4/2017 | Schab | ................. | A01K 29/005 |
| 2003/0167908 A1 * | 9/2003 | Nishitani | ........... | A63B 71/0686 84/723 |
| 2005/0046583 A1 * | 3/2005 | Richards | .............. | G01S 5/0036 340/3.1 |
| 2008/0252293 A1 * | 10/2008 | Lagae | .................... | G01S 7/411 324/318 |
| 2012/0059268 A1 * | 3/2012 | Tupin, Jr. | ............. | A61B 5/0002 600/484 |
| 2012/0249797 A1 * | 10/2012 | Haddick | ................. | G06F 1/163 348/158 |
| 2013/0127980 A1 * | 5/2013 | Haddick | ................. | G06F 3/013 348/14.08 |
| 2014/0361909 A1 * | 12/2014 | Stelfox | ............. | G06K 7/10227 340/870.07 |
| 2015/0269783 A1 * | 9/2015 | Yun | .................... | G02B 27/0172 345/633 |
| 2016/0066811 A1 * | 3/2016 | Mohamadi | ........... | A61B 5/0507 600/430 |
| 2016/0143558 A1 * | 5/2016 | Chernokalov | ....... | A61B 5/0507 600/430 |
| 2016/0316542 A1 * | 10/2016 | Wein | .................. | G06K 19/0702 |
| 2017/0100631 A1 * | 4/2017 | Wu | ..................... | A63B 24/0062 |
| 2017/0168566 A1 * | 6/2017 | Osterhout | .............. | G06F 3/014 |
| 2017/0173387 A1 * | 6/2017 | Wohl | ................. | A63B 24/0021 |
| 2017/0177091 A1 * | 6/2017 | Shah | ....................... | G06F 3/017 |

OTHER PUBLICATIONS

Van Poucke, B., et al., "Ultra-Wideband Communication for Low-Power Wireless Body Area Networks," RSC #15 © www.industrial-embedded.com/rsc, Industrial Emdbedded Systems Resource Guide, 2005.

\* cited by examiner

ULTRA-WIDE BAND (UWB) RADIO-BASED OBJECT SENSING

FIELD

Embodiments of the present disclosure generally relate to the field of object sensing. More specifically, embodiments of the present disclosure relate to devices and methods for using ultra-wideband (UWB) radio transceivers within a flexible layer of material to determine the position of an object relative to the surface of the material.

BACKGROUND

Over the last several years it has become increasingly desirable to integrate physical activities along with digital representations of those activities. For example, physical activities typically involve the movement of physical objects, and these objects may have specialized hardware or other features that may facilitate identifying the location of the object relative to other objects. This may be true of a wide variety of activities including music, sports, demonstrations, navigation, and the like. Integrating digital representations may typically involve a lot of preparation time setting up the infrastructure to capture the digital representations of the various objects during the activity. This preparation may include setting up and calibrating various mechanisms within an infrastructure that is used to track objects during the activities. Moving and recalibrating this infrastructure in legacy systems used to capture digital representations of activities is typically cumbersome and challenging.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
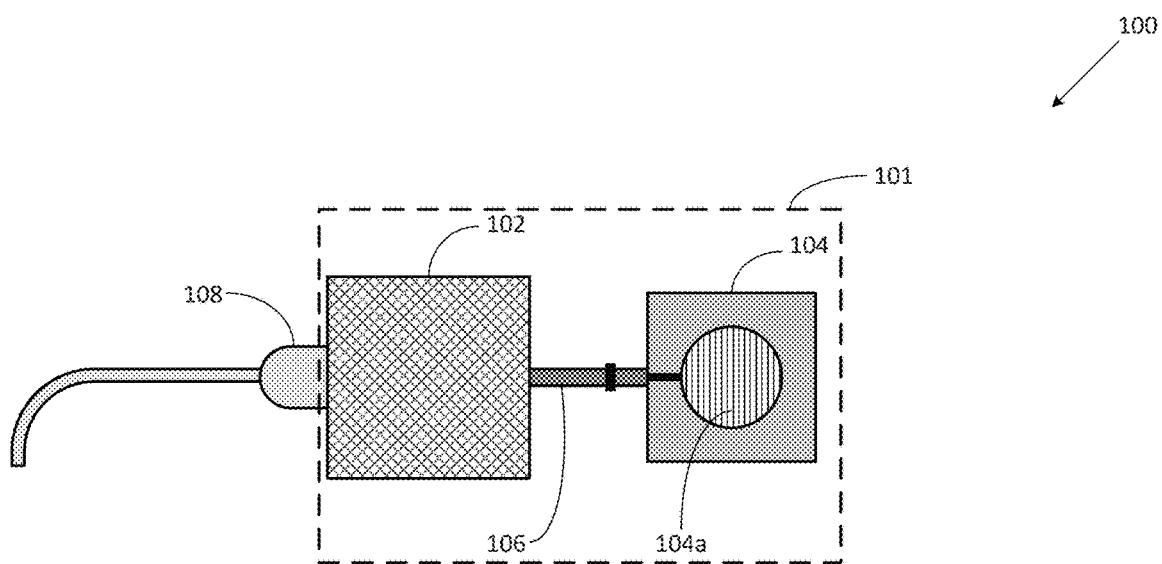
FIG. 1 is a diagram of an example flexible UWB sensor with an antenna and a transceiver suitable for use to practice the present disclosure, in accordance with some embodiments.

Methods, apparatuses, and systems for sensing objects with multiple UWB radio sensors are disclosed herein. In embodiments, a flexible layer of material, such as a carpet, may be rolled up and moved from location to location, and deployed at the various locations at different points in time. The flexible layer of material may include multiple UWB radio sensors embedded therein. The multiple UWB radio sensors may receive a UWB radio signal from a tag attached to an object proximally disposed with the flexible layer of materials. In embodiments, a server may use information aggregated from the multiple UWB radio sensors and apply various processes to determine the location or the movement of the object to which the tag is affixed. These processes may include, in non-limiting examples, time-difference on arrival, time-of-flight, and phase shift processing based on received signals by the UWB sensors.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

Various operations are described as multiple discrete operations in turn, in a manner that is most helpful in understanding the claimed subject matter. However, the order of description should not be construed as to imply that these operations are necessarily order dependent.

FIG. 1 is a diagram of a flexible UWB sensor with an antenna and a transceiver, in accordance with some embodiments. Diagram 100 shows an embodiment of a flexible UWB sensor which may include a transceiver/antenna combination. In embodiments, the flexible UWB sensor 100 may include a transceiver 102 that is connected to an antenna 104, and may be coupled to the transceiver 102 by a connector 106. In embodiments, the connector 106 may be flexible connection that may allow the antenna 104 to bend and/or flex in any of the three dimensions with respect to transceiver 102. The antenna 104 may include wiring 104a that may be used to receive UWB radio signals from a UWB radio transmission source (not shown). In embodiments, the transceiver 102, connector 106, an antenna 104 may be implemented as a flexible circuit and embedded within a flexible material 101. In embodiments, the electronic hardware components may be flattened, and may be connected using a flexible polymer such as polydimethylsiloxane (PDMS) or some other flexible substrate. In embodiments the antenna 104 may be miniaturized to a chip, or a wire antenna may be used. For example a flexible plastic casing, that may be used to secure the position of the transceiver 102, connector 106 and antenna 104 as the flexible UWB sensor 100 is bent or flexed.

In embodiments, the transceiver 102 may be configured to receive and process the UWB radio signals received from the antenna 104. In embodiments, the transceiver 102 may process the received signals, and send the processed signals to another system (not shown). In embodiments, non-limiting examples of other system may include a UWB master, described further in FIG. 4, or a server, described further in FIG. 8. In embodiments, the transceiver 102 may send the processed signals over an Ethernet connection 108. In other embodiments, some other connection may be used such as a universal serial bus (USB), FireWire™ or other physical connection. In other embodiments, the transceiver 102 may communicate using a wireless connection such as Wi-Fi.

The transceiver 102 may receive information from a tag (not shown) that may be connected to an object to be sensed.

In embodiments, the tag may transmit UWB radio signals that are picked up by the flexible UWB sensor 100 using antenna 104. In embodiments, a tag may transmit other data, for example data from inertial measurement unit (IMU) sensors coupled with the tag that may include data of metrics collected and/or calculated, for example speed, velocity, acceleration, deceleration, deceleration intensity, deceleration rate, and the like. This data may be received by the flexible UWB sensor 100, processed, and transmitted to, for example, a server for processing. Non-limiting examples of uses of this data may include for boxing, which is further described in FIG. 5 and for playing the drums, which is further described in FIG. 6.

Figure 2:
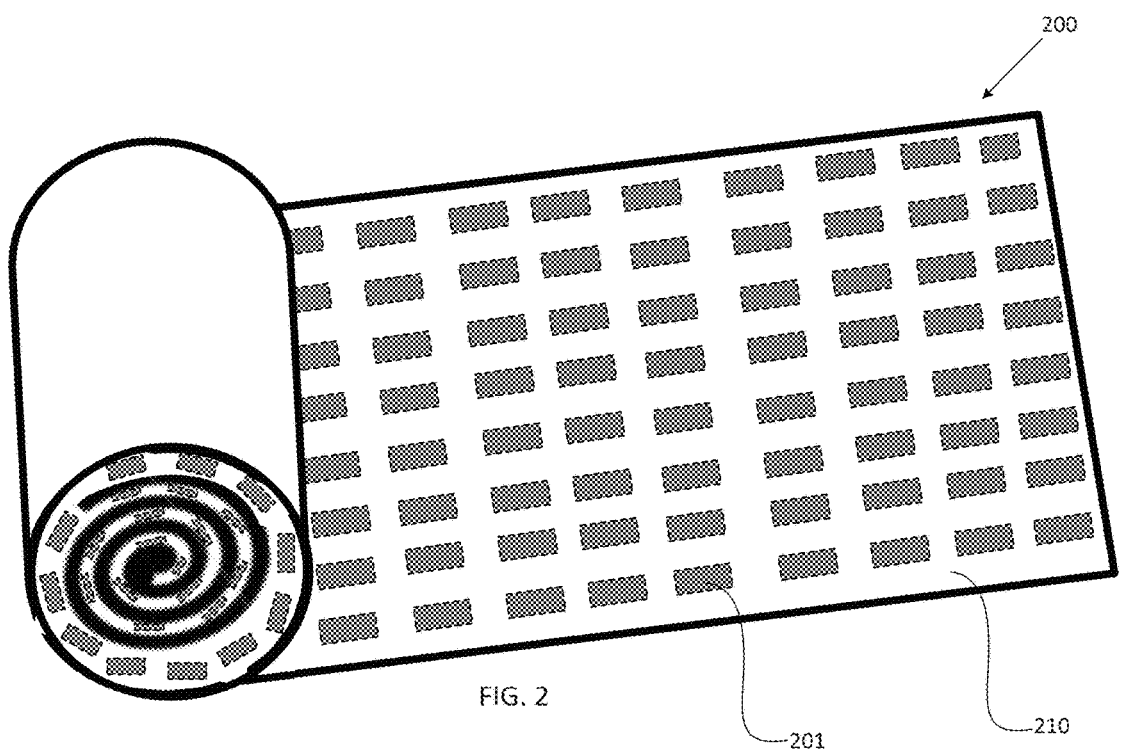
FIG. 2 illustrates an example partially rolled carpet with a grid of UWB sensors embedded within the carpet in an array, in accordance with some embodiments.

FIG. 2 illustrates an example flexible layer of material, a partially rolled carpet, with a grid of UWB sensors embedded within the carpet in an array, in accordance with some embodiments. Diagram 200 shows an example of a flexible layer of material 210. In non-limiting examples, the flexible layer of material 210 may be a carpet, a rug, artificial grass, Astroturf™, and the like. In embodiments, individual UWB sensors 201, which may be similar to flexible UWB sensors 100 of FIG. 1, may be embedded into a determined location within the layer of material 210. In embodiments, UWB sensors 201 may be UWB sensors, having a transceiver, an antenna and connector that are not embedded in a flexible material (not shown).

Diagram 200 shows an example of an array of UWB sensors 201 laid out in a rectangular pattern. In embodiments, as the flexible layer of material 210 may be rolled up and unrolled, or folded and unfolded, the location of the UWB sensors 201 relative to each other will remain substantially constant. In embodiments, other components may be embedded into the material 210, including wiring (not shown) that connects the UWB sensors 201 to provide data and/or power connection, and UWB masters (not shown) that may service aggregation points for the data sent from UWB sensors 201. UWB masters are further described in FIG. 4.

In embodiments, the flexible layer of material 210 may be laid flat onto a flat surface. In embodiments, the flexible layer of material 210 may be customized into various shapes and sizes depending upon the object-sensing application. As shown in diagram 200, the UWB sensors 201 may be laid out in a regular grid pattern.

Figure 3A:
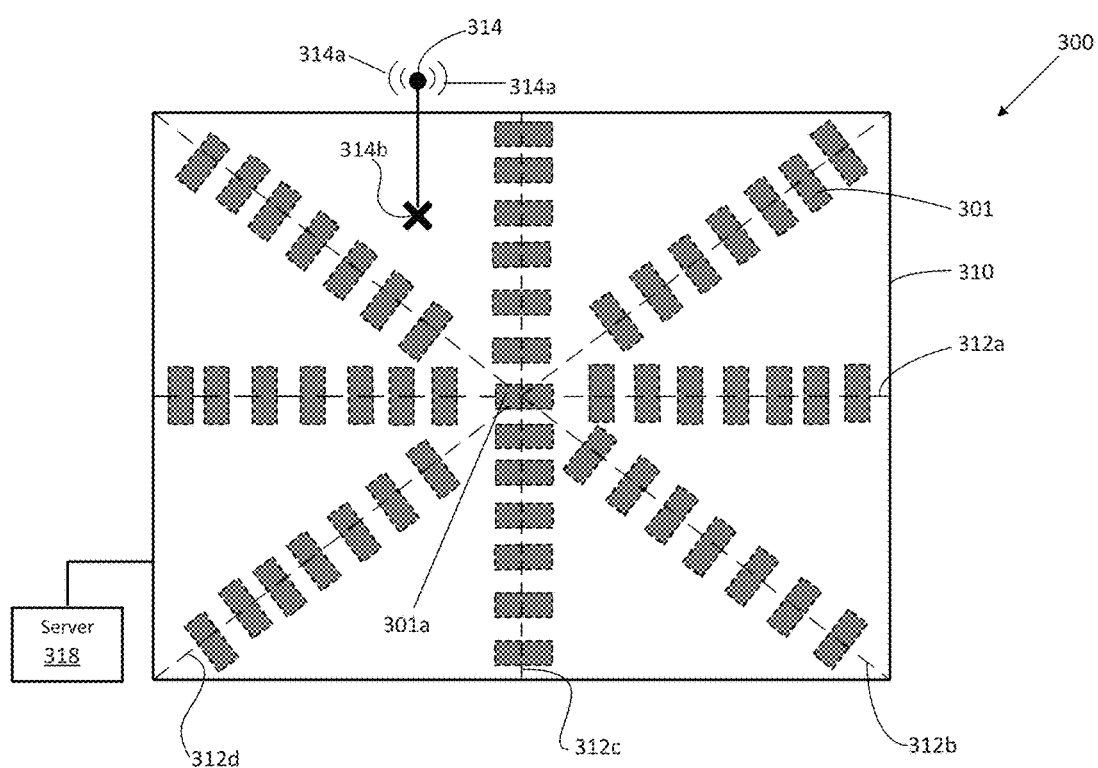
FIG. 3A illustrates an example carpet with a grid of UWB sensors embedded within the carpet in a radial pattern, in accordance with some embodiments.

FIG. 3A illustrates an example carpet with a grid of UWB sensors embedded within the carpet in a radial pattern, in accordance with some embodiments. Diagram 300 shows a flexible layer of material 310, which may be similar to the flexible layer of material 210 of FIG. 2, with the plurality of UWB sensors 301, which may be similar to UWB sensor 101 of FIG. 1. In accordance with some embodiments, the UWB sensors 301 may be laid out in a radial pattern as shown. A UWB sensor 301a may be placed in the center of the radial pattern, with additional UWB sensors 301 distributed along radial lines 312a, 312b, 312c and 312d.

In embodiments, during operation a tag 314 proximate to the flexible layer of material 310 may broadcast UWB radio signals 314a that may be received by the one or more UWB sensors 301. In embodiments, a tag 314 may be affixed to an object (not shown). In embodiments, the UWB sensors 301 may generate a second set of signals based upon the received UWB radio signals and send the second set of signals to a server 318 to which the UWB sensors 301 are coupled.

In embodiments, the server 318 may take these received second set of signals and process them to determine the location of the object 314 in relation to the flexible layer of material 310. In embodiments, the server may use various processes including time-difference on arrival, time-of-flight, and phase shift to estimate the location of the tag 314. In embodiments, the tag 314 may be affixed to an object (not shown), and therefore determining the location of tag 314 may be used to determine the location of the object relative to the flexible layer of material 310. In embodiments, the location of the tag 314 relative to the flexible layer of material 310 may be an orthogonal projection of the location of the tag 314 onto the X-Y plane of the flexible layer of material 314b.

Figure 3B:
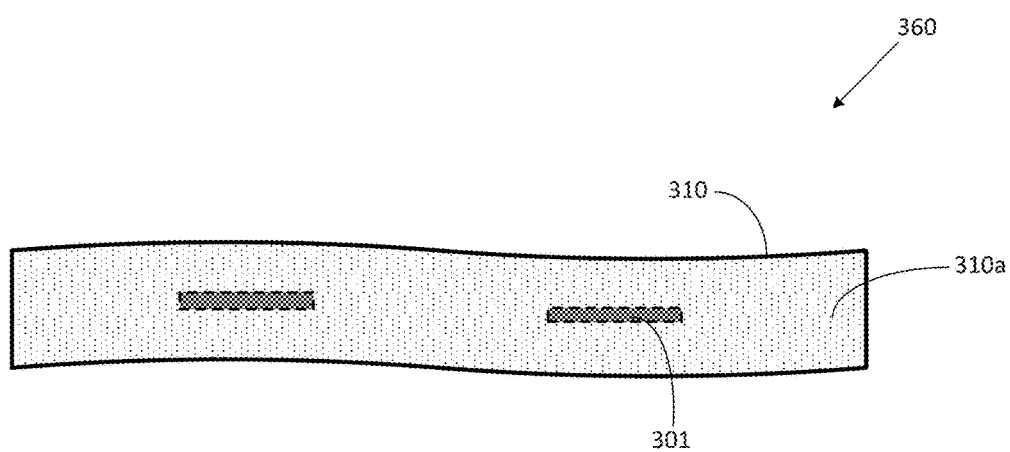
FIG. 3B illustrates a cross-section of an example carpet with UWB sensors embedded, in accordance with some embodiments.

FIG. 3B illustrates a cross-section of an example carpet with UWB sensors embedded, in accordance with some embodiments. Diagram 360 shows a cross-section of a carpet 310 into which two UWB sensors 301 are embedded (shown in a side view). In embodiments, the interior 310a of the carpet 310 may be made of fibers, foam, or other material that is flexible while firmly holding UWB sensors 301 in place so they do not substantially shift positions when the carpet 310 is rolled up, carried two new location, and unrolled. In embodiments, there may be additional threads (not shown) that connect the multiple UWB sensors 301 to allow them to stay in a uniform position.

Figure 4:
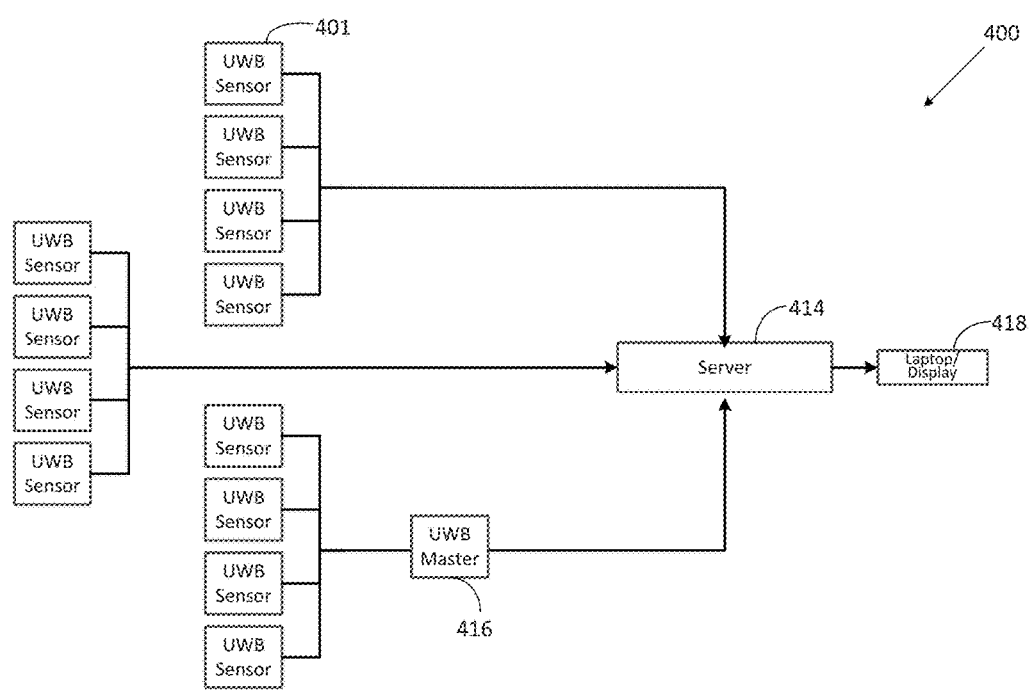
FIG. 4 is a diagram of a plurality of UWB sensors that are connected to a server, in accordance with some embodiments.

FIG. 4 is a diagram of a plurality of UWB sensors that are coupled to a server, in accordance with some embodiments. Diagram 400 shows one embodiment of a coupled configuration of UWB sensors 401, which may be similar to UWB sensor 201 of FIG. 2. In embodiments, one or more UWB sensors 401 may be coupled directly to a server 414, which may be similar to server 314 of FIG. 3A. In alternative embodiments, one or more UWB sensors 401 may be coupled to a UWB master, 416, which may then be coupled with the server 414.

In embodiments, the server 414 may be connected to a laptop 418 or other computing device (such as a desktop, or a tablet) to display information related to the location and/or the movement of the object or to otherwise process the location and/or the movement of the object. In embodiments, a portion or all of the processing of signals 314a from a tag 314 to one or more UWB sensors 401 may be done within a UWB master 416 or the within the server 414.

Figure 5:
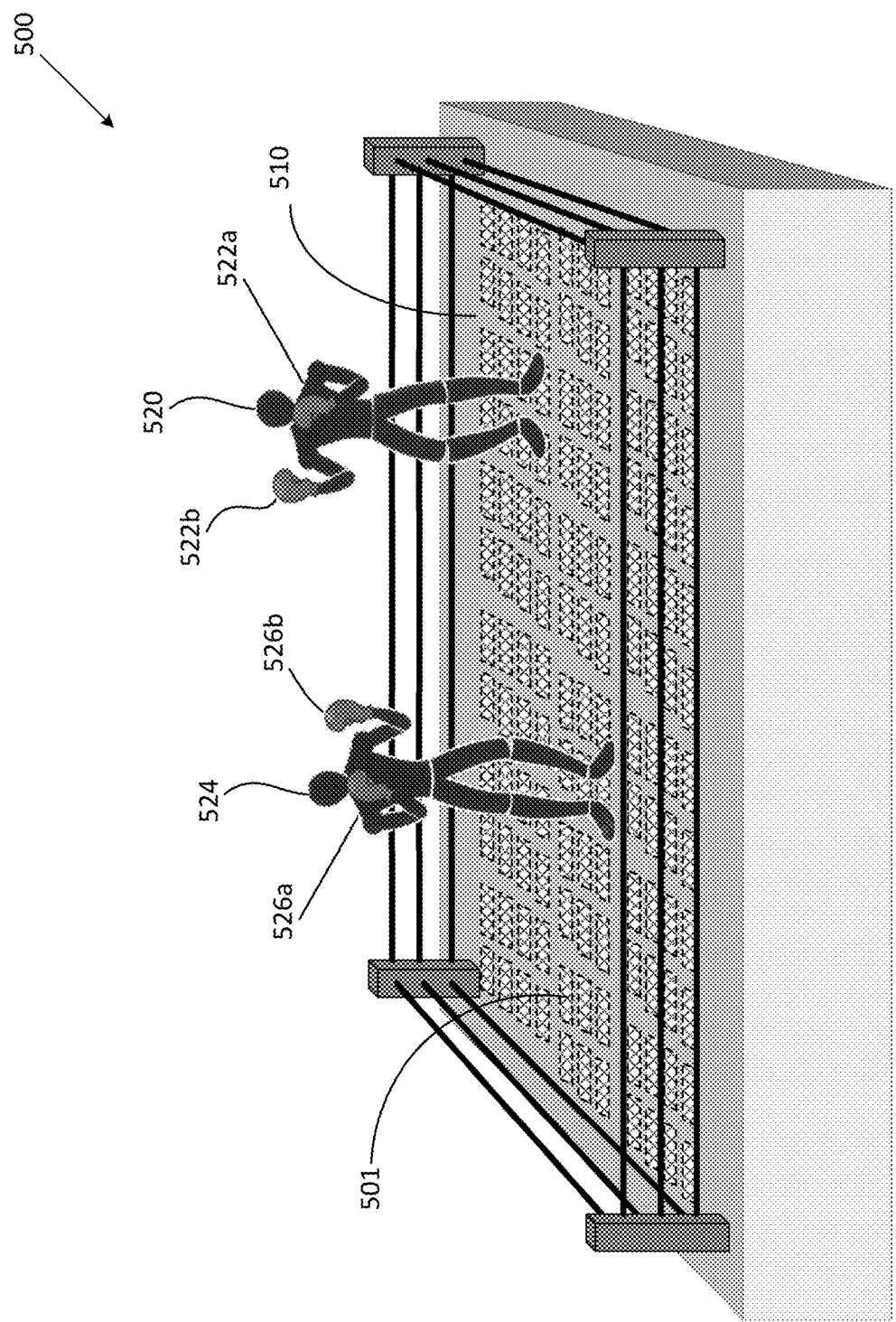
FIG. 5 illustrates tags on boxing gloves used over a mat containing multiple UWB sensors, in accordance with some embodiments.

FIG. 5 illustrates tags on boxing gloves used over a mat containing multiple UWB sensors, in accordance with some embodiments. Diagram 500 shows one embodiment of using multiple UWB sensors 501 embedded within a flexible layer of material 510, which may be similar to the flexible layer of material 310 of FIG. 3A, which may serve as the mat of a boxing ring. A first boxer 520 wearing boxing gloves 522a, 522b, and a second boxer 524 wearing boxing gloves 526a, 526b may be in a boxing match. UWB tags (not shown) attached to the boxing gloves 522a, 522b, 526a, 526b may send UWB signals, such as signals 314a of FIG. 3A, that are received by multiple UWB sensors 501. The UWB sensors 501 may subsequently transmit a second signal to a server, for example server 318 of FIG. 3A, for further processing to determine the location and the movement of the boxing gloves 522a, 522b, 526a, 526b.

In embodiments, the tags affixed to the boxing gloves 522a, 522b, 526a, 526b may be coupled to IMU sensors to provide additional data on the location and/or movement of the tags that may be sent to the multiple UWB sensors 501. For example, this data may be used to determine, in non-limiting examples, information about a punch or a block, including the type of the puncher block, speed, velocity, acceleration, strike intensity, strike rate, and whether the strike was sent on offensive versus the defensive strike, and the like. In embodiments, this information may also be provided by analyzing a sequence of locations of the tags affixed to the boxing gloves 522a, 522b, 526a, 526b over discreet periods of time.

In embodiments, other sports besides boxing may be digitally augmented by using UWB sensors 501 embedded within a flexible layer of material 510 on which the sport may be played. In non-limiting examples, the sports may include soccer, rugby, handball, and the like.

Figure 6:
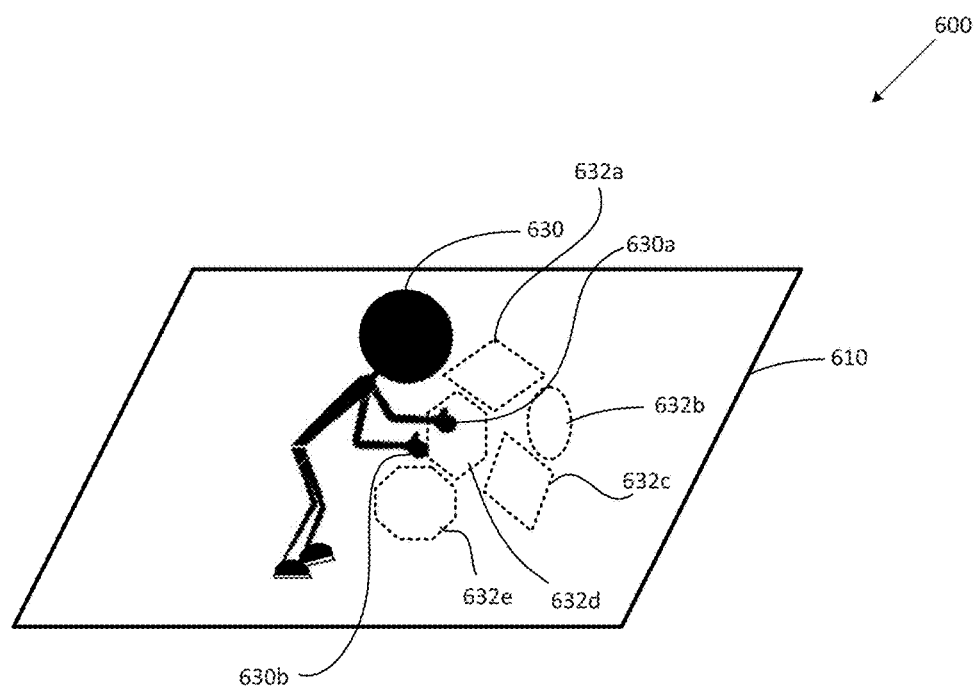
FIG. 6 illustrates a drum set on a carpet containing UWB sensors to capture a musical percussion performance, in accordance with some embodiments.

FIG. 6 illustrates a drum set on a flexible layer of material containing UWB sensors to capture a musical percussion performance, in accordance with some embodiments. FIG. 600 shows a drum set with areas where various virtual drums and/or cymbals may be located. In embodiments, a user may unroll the carpet 610, which may be similar to the flexible layer of material 210 that contains multiple UWB sensors similar to UWB sensors 301 of FIG. 3A.

In embodiments, a user 630 may stand on the carpet 610 while wearing a UWB tag wristband 630a, 630b. In embodiments, the position of the tag wristband 630a, 630b with respect to the carpet 610 may be sensed. In embodiments, the area above the carpet 610 may be logically divided into multiple zones 632a-632e, each of which may, for example, correspond to a particular percussion instrument. In embodiments, each zone 632a-632e may be mapped to a unique sound such that when the user 630 taps their hand in a zone 632a-632e, a corresponding sound may be played. In embodiments, the sounds that are played may be customized through a software application coupled to a server, such as server 314 of FIG. 3A.

In embodiments, aids may be used to help the user 630 identify the location of the multiple zones 632a-632e. In one example, an overlay (not shown) may be placed on the carpet 610 to visually indicate the location of each zone that extends in a direction perpendicular to the plane of the carpet 610.

Figure 7:
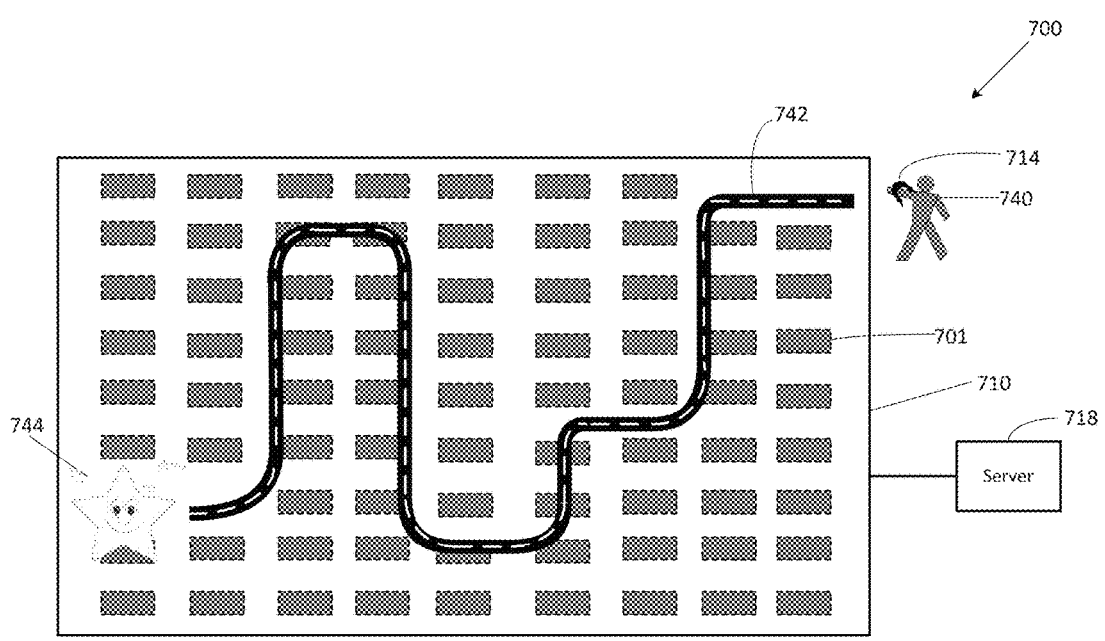
FIG. 7 illustrates an example flexible play mat containing a plurality of UWB sensors used to guide a machine along a number of determined paths along the floor, in accordance with some embodiments.

FIG. 7 illustrates an example flexible play mat containing a plurality of UWB sensors used to guide a child along a number of determined paths along the rolled-out play mat, in accordance with some embodiments. Diagram 700 shows a flexible layer of material 710, which may be similar to the flexible layer material 310 of FIG. 3A. UWB sensors 701, which may be similar to UWB sensors 301 of FIG. 3A, may be embedded into the flexible layer material 710. In embodiments, the flexible layer material 710 may be deployed in a school, a preschool, or other such environment, where the flexible layer of material 710 may be a carpet rolled out on the floor.

A child 740 may wear a UWB tag 714, which may be similar to UWB tag 314 of FIG. 3A, proximate to the person 740 that transmits UWB radio signals, such as radio signals 314a of FIG. 3A. These signals are received by a plurality of UWB sensors 701 that may then send second signals to a server 718, which may be similar to server 318 of FIG. 3A the server 318 may then processes the received signals and may then determine the location and/or the movement of the user 740 with respect to the flexible layer material 710.

In embodiments, there may be one or more paths 742 for the child 740 to follow while the child 740 walks across the flexible layer material 710. For example, the child 740 may wish to be directed to a prize 744. The server 718 may then send directions to the child 740 to allow them to navigate the path 742. In other embodiments, the child 740 may be a vehicle or other object that is to be moved along one or more paths 742. In embodiments, the flexible layer of material 710 may be used on the ceiling to sense the child or object 740.

In embodiments, as the child 740 progresses along the flexible layer material 710, the server 718 may determine, based upon an analysis of the current location of the child 740 or of previous locations of the child 740, whether the child 740 may be on a desirable or a non-desirable. In embodiments, the server may store the location of one or more desirable paths or locations, or may store metadata describing one or more desirable paths or locations 742.

In embodiments, the server 718 may indicate, or may cause to indicate, feedback to the child 740 on its progress. For example, the feedback may include audio feedback to speakers controlled by the server 718 and proximate to the child 740. In other examples, the feedback may include visual feedback, such as through a display or through lights (not shown) that may be in that it in the flexible layer of material 710.

In embodiments, two or more areas of flexible layer material 310 may be positioned in a non-parallel manner (not shown), for example two separate carpets having UWB sensors 701 embedded into the carpets. In non-limiting examples, these carpets may be positioned and an orthogonal manner, such as one on the floor and one along and adjacent vertical wall. In these positions, X-Y location determinations of a UWB tag made by the sensors in the respective carpets may be used to determine the location of the UWB tag in three-dimensional space.

Figure 8:
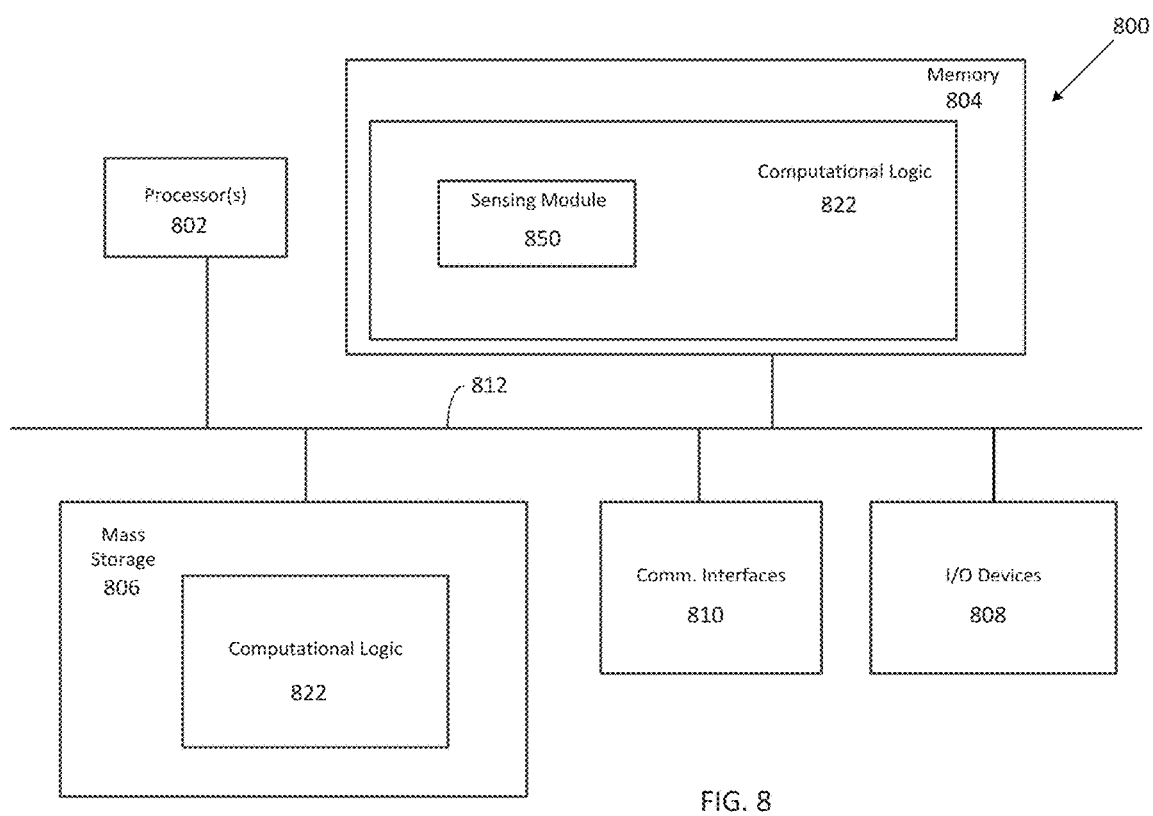
FIG. 8 illustrates an example computing device suitable for use to practice aspects of the present disclosure, in accordance with various embodiments.

FIG. 8 illustrates an example computing device 800 suitable for use to practice aspects of the present disclosure, in accordance with various embodiments. For example, the example computing device 800 may be suitable to implement the functionalities associated with diagrams 100, 200, 300, 400, 500, 600, 700, and 900.

As shown, computing device 800 may include one or more processors 802, each having one or more processor cores, and system memory 804. The processor 802 may include any type of unicore or multi-core processors. Each processor core may include a central processing unit (CPU), and one or more level of caches. The processor 802 may be implemented as an integrated circuit. The computing device 800 may include mass storage devices 806 (such as diskette, hard drive, volatile memory (e.g., dynamic random access memory (DRAM)), compact disc read only memory (CD-ROM), digital versatile disk (DVD) and so forth). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 800 may further include input/output (I/O) devices 808 such as a display, keyboard, cursor control, remote control, gaming controller, image capture device, one or more three-dimensional cameras used to capture images, and so forth, and communication interfaces 810 (such as network interface cards, modems, infrared receivers, transceivers, radio receivers (e.g., UWB, Bluetooth), and so forth). I/O devices 808 may be suitable for communicative connections with UWB sensors or UWB masters or user devices. In some embodiments, I/O devices 808 when used as user devices may include a UWB tag or other device necessary for implementing the functionalities of determining the location and/or movement of the UWB tag as described in reference to FIGS. 1-7.

The communication interfaces 810 may include communication chips (not shown) that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), Long Term Evolution (LTE) network, or UWB radio-based communication. The communication chips may also be configured to operate in accordance with Enhanced Data for GSM Evolution (EDGE), GSM EDGE Radio Access Network (GERAN), Universal Terrestrial Radio Access Network (UTRAN), Evolved UTRAN (E-UTRAN), or or UWB radio-based communication. The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond, including UWB radio-based communication. The communication interfaces 810 may operate in accordance with other wireless protocols in other embodiments.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions implementing the operations and functionalities associated with the UWB master 416 and server 414 of diagram 400, generally shown as computational logic 822. Computational logic 822 may be implemented by assembler instructions supported by processor(s) 802 or high-level languages that may be compiled into such instructions.

In embodiments, the Computational Logic 822 may contain a sensing module 850, which may perform one or more of the functions associated with diagrams 100, 200, 300, 400, 500, 600, 700, and 900.

The permanent copy of the programming instructions may be placed into mass storage devices 806 in the factory, or in the field, though, for example, a distribution medium (not shown), such as a compact disc (CD), or through communication interfaces 810 (from a distribution server (not shown)).

Figure 9:
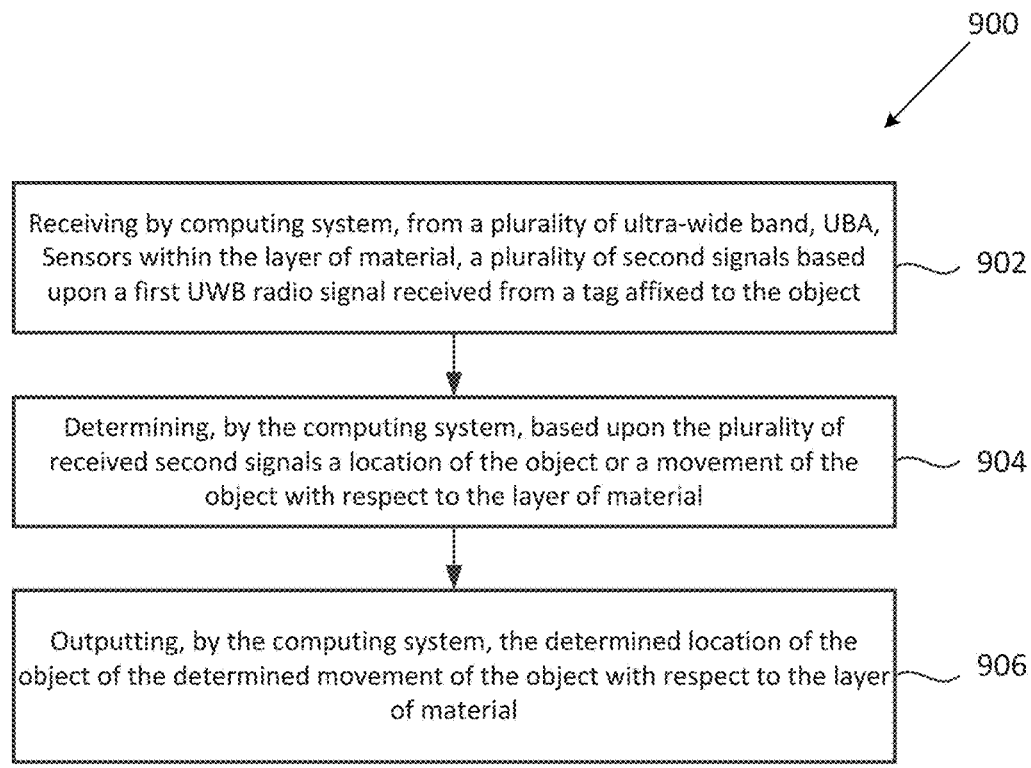
FIG. 9 is a block diagram illustrates a process for implementing a flexible layer of material with embedded UWB sensors to determine object position, in accordance with some embodiments.

FIG. 9 is a block diagram illustrates a process for implementing a UWB carpet to determine object position, in accordance with some embodiments. In some embodiments, the UWB sensors 101 of FIG. 1, the UWB tags 314 of FIG. 3A, the UWB master 416, the server 414 and the laptop 418 FIG. 4 may perform one or more processes, such as the process 900.

At block 902, the process may receive from a plurality of ultra-wide band, UWB, sensors within the a layer of material, a plurality of second signals based upon a first UWB radio signal received from a UWB tag affixed to the object. In embodiments, the first signals may be signals 314a sent by UWB tag 314 of FIG. 3A. In embodiments, the second signals may be sent by UWB sensors 301 to server 318 of FIG. 3A. In embodiments, the second signals may be sent wirelessly or through wired communications. In embodiments, the layer of material 310 of FIG. 3A and may include UWB sensors 301 embedded within material 310.

At block 904, the process may determine based upon the plurality of received second signals a location of the object or a movement of the object with respect to the layer of material. In embodiments, this determination may be performed by the server 318 upon receiving the second signals from the UWB sensors 301. In embodiments, the process may determine the location and/or movement of the object by analyzing these respective second signals in relationship to each other. In embodiments, this may include using time-difference on arrival, time of flight, and phase shift algorithms.

At block 906, the process may output the determined location of the object or the determined movement of the object with respect to the layer of material. In embodiments, the location of the object, such as an object with UWB tag 314 affixed, may be determined based upon an orthogonal projection of the object upon the layer of material 310 in a 2-D plane.

Figure 10:
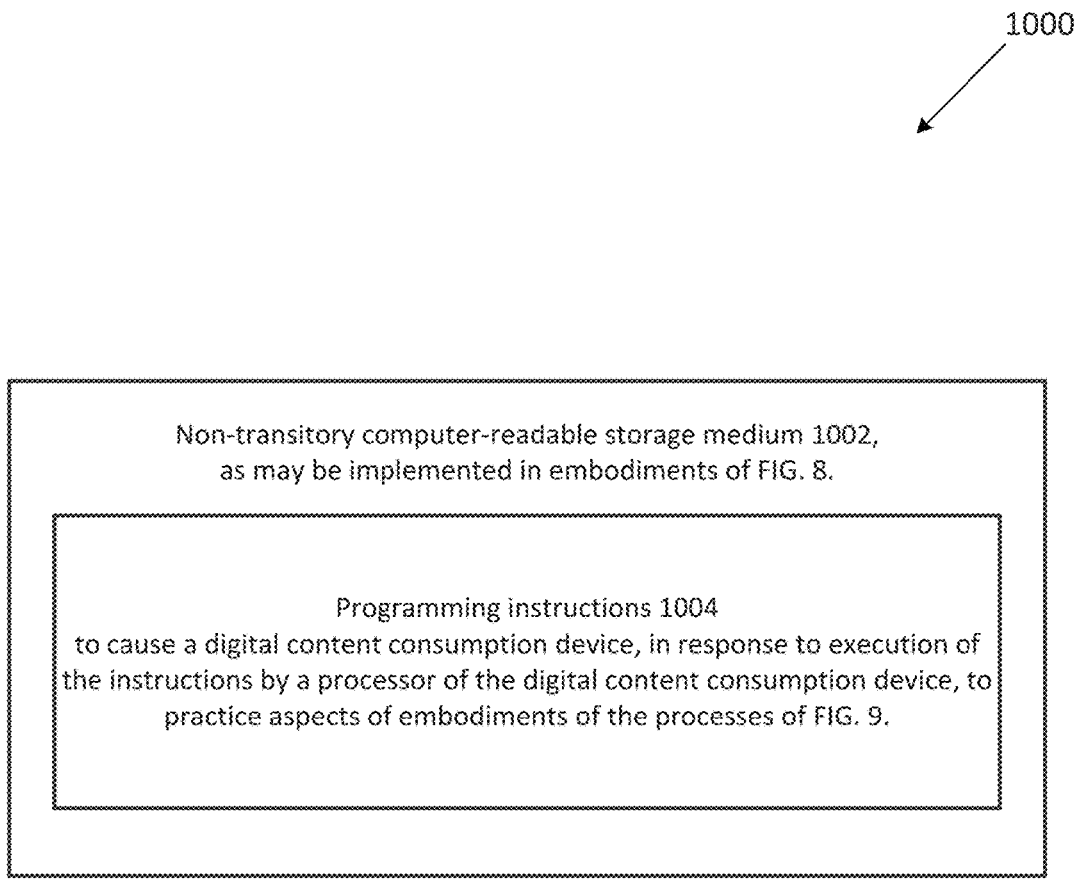
FIG. 10 is a diagram illustrating computer readable media having instructions for practicing using a flexible layer of material with embedded UWB sensors to determine object position, in accordance with some embodiments.

FIG. 10 is a diagram 1000 illustrating computer readable media 1002 having instructions for practicing the above-described techniques, or for programming/causing systems and devices to perform the above-described techniques, in accordance with various embodiments. In some embodiments, such computer readable media 1002 may be included in a memory or storage device, which may be transitory or non-transitory, of the server 318 of FIG. 3A. In embodiments, instructions 1004 may include assembler instructions supported by a processing device, or may include instructions in a high-level language, such as C, that can be compiled into object code executable by the processing device. In some embodiments, a persistent copy of the computer readable instructions 1004 may be placed into a persistent storage device in the factory or in the field (through, for example, a machine-accessible distribution medium (not shown)). In some embodiments, a persistent copy of the computer readable instructions 1004 may be placed into a persistent storage device through a suitable communication pathway (e.g., from a distribution server).

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be an apparatus for sensing an object, comprising: a layer of material; and a plurality of ultra-wideband, UWB, radio sensors integrated within the layer of material at various locations, wherein individual UWB radio sensors are to receive first signals, which are UWB radio signals, from an object proximate to the layer of material and transmit second signals based on receipt of the first signals.

Example 2 may include the apparatus of Example 1, wherein the layer of material is flexible.

Example 3 may include the apparatus of Example 1, wherein the layer of material is portable.

Example 4 may include the apparatus of Example 1, wherein the layer of material is a carpet, and wherein the individual UWB radio sensors are embedded in the carpet.

Example 5 may include the apparatus of any Examples 1-4, wherein a first UWB radio sensor of the plurality of UWB radio sensors includes a UWB radio antenna coupled with a receiver, wherein the first UWB radio sensor is a flexible circuit.

Example 6 may include the apparatus of any Examples 1-4, wherein the multiple UWB radio sensors are positioned within the layer of material in a grid pattern or in a radial pattern.

Example 7 may include the apparatus of any Examples 1-4, wherein the second signal is transmitted via Wi-Fi, UWB radio, Bluetooth™, universal serial bus, USB, or Ethernet.

Example 8 may include the apparatus of any Examples 1-4, wherein the multiple UWB radio sensors are to receive UWB signals from a tag affixed to the object.

Example 9 may include the apparatus of any Examples 1-4, wherein the multiple UWB radio sensors are coupled to a UWB controller to receive multiple second signals from the multiple UWB sensors.

Example 10 may include the apparatus of Example 9, wherein the UWB controller is to determine the location of the object based upon the received multiple second signals from the multiple UWB sensors.

Example 11 may include the apparatus of Example 10, wherein to determine the position of the object is further to determine the position of the object as projected onto the layer of material.

Example 12 may include the apparatus of any Examples 1-4, wherein the object is a plurality of objects.

Example 13 may be a system for sensing an object, comprising: one or more computer processors; memory coupled to the one or more computer processors; and a sensing module, to be loaded onto the memory and executed by the one or more processors, to sense an object relative to a plurality of ultra-wideband, UWB, radio sensors integrated within a layer of flexible material, wherein the plurality of UWB radio sensors receive a first UWB radio signal from the object; and wherein the sensing module is to: receive, from the plurality of UWB radio sensors, a plurality of second signals based upon the first UWB radio signal received by the UWB radio sensors; determine, based upon the plurality of received second signals a location of the object or a movement of the object with respect to the layer of material; and output the determined location of the object or the determined movement of the object with respect to the layer of material.

Example 14 may include the system of Example 13, wherein a tag affixed to the object is to send the first UWB radio signal.

Example 15 may include the system of Example 13, wherein the layer of material includes an overlay that visually indicates one or more locations with respect to the layer of material.

Example 16 may include the system of Examples 13-15, wherein the object is a hand of a user; and wherein the sensing module is further to play or cause to play a sound corresponding to the determined location of the hand or the determined movement of the hand.

Example 17 may include the system of Example 16, wherein the determined movement is a tap.

Example 18 may include the system of Example 16, wherein play or cause to play a sound comprises play or cause to play a drum sound.

Example 19 may include the system of any Examples 13-15, wherein the object is a plurality of limbs of a user; and wherein the sensing module is further to determine, based on the received second signals, the location or movement of the one or more limbs of the user.

Example 20 may include the system of Example 19, wherein the sensing module is further to determine a speed, velocity, acceleration, strike intensity, or strike rate of the one or more limbs of the user based upon the movement of the one or more limbs of the user.

Example 21 may include the system of Example 19, wherein a plurality of tags are affixed to respectively to the one or more limbs of the user; wherein each of the plurality of tags further includes an inertial measurement unit, IMU, sensor; and wherein the sensing module is further to: receive data from the IMU sensor; and output the received the data from the IMU sensor.

Example 22 may include the apparatus of Example 21, wherein the user is performing the sport of boxing.

Example 23 may include the system of any Examples 13-15, wherein the sensing module is further to: determine a navigation command based upon the determined location or the determined movement of the object with respect to the layer of material and a map; and send or cause to send a navigation indication to the object.

Example 24 may include the system of Example 23, wherein the navigation indication is a location, a direction of movement, or a speed of movement.

Example 25 may include the system of Example 23, wherein the system is to guide the object through a predetermined path.

Example 26 may include the system of Example 23, wherein the layer of material is on a floor or on a ceiling.

Example 27 may include the system of Example 23, wherein the object is a human or a machine.

Example 28 may be a method for sensing an object relative to a flexible layer of material, comprising receiving, by a computing system, from a plurality of ultra-wide band, UWB, sensors within the flexible layer of material, a plurality of second signals based upon a first UWB radio signal received from a tag affixed to the object; determining, by the computing system, based upon the plurality of received second signals a location of the object or a movement of the object with respect to the layer of material; and outputting, by the computing system, the determined location of the object or the determined movement of the object with respect to the layer of material.

Example 29 may include the method of Example 28, wherein a tag affixed to the object is to send the first UWB radio signal.

Example 30 may include the method of Example 28, wherein the layer of material includes an overlay that visually indicates one or more locations with respect to the layer of material.

Example 31 may include the method of any Examples 28-30, wherein the object is a hand of a user; and wherein the method further comprises playing or causing to play, by the computing system, a sound corresponding to the determined location of the hand or the determined movement of the hand.

Example 32 may include the method of Example 31, wherein the determined movement is a tap.

Example 33 may include the method of Example 31, wherein playing or causing to play a sound comprises play or cause to play a drum sound.

Example 34 may include the method of any one of Examples 28-30, wherein the object is a plurality of limbs of a user; and wherein the method further comprises determining, based on the received second signals, the location or movement of the one or more limbs of the user.

Example 35 may include the method of Example 34, further comprising determining a speed, velocity, acceleration, strike intensity, or strike rate of the one or more limbs of the user based upon the movement of the one or more limbs of the user.

Example 36 may include the method of Example 34, wherein a plurality of tags are affixed to respectively to the one or more limbs of the user; wherein each of the plurality of tags further includes an inertial measurement unit, IMU, sensor; and wherein the method further comprises: receiving, by the computing system, data from the IMU sensor; and outputting, by the computing system, the received the data from the IMU sensor.

Example 37 may include the method of Example 36, wherein the user is performing the sport of boxing.

Example 38 may include the method of any one of Examples 28-30, further comprising: determining, by the computing system, a navigation command based upon the determined location or the determined movement of the object with respect to the layer of material and a map; and sending or causing to send a navigation indication to the object.

Example 39 may include the method of Example 38, wherein the navigation indication is a location, a direction of movement, or a speed of movement.

Example 40 may include the method of Example 38, wherein the method is to guide the object through a predetermined path.

Example 41 may include the method of Example 38, wherein the layer of material is on a floor or on a ceiling.

Example 42 may include the method of Example 38, wherein the object is a human or a machine.

Example 43 may be one or more computer-readable media comprising instructions that cause a computing device, in response to execution of the instructions by the computing device, to: receive, by a sensing module operating on a computing system, from a plurality of ultra-wide band, UWB, radio sensors within a flexible layer of material, a plurality of second signals based upon a first UWB radio signal received by the UWB radio sensors; determine, by the sensing module operating on the computing system, based upon the plurality of received second signals a location of an object or a movement of the object with respect to the layer of material; and output, by the sensing module operating on the computing system, the determined location of the object or the determined movement of the object with respect to the flexible layer of material.

Example 44 may include one or more computer readable media of Example 43, wherein a tag affixed to the object is to send the first UWB radio signal.

Example 45 may include the method of Example 43, wherein the layer of material includes an overlay that visually indicates one or more locations with respect to the layer of material.

Example 46 may include one or more computer readable media of any Examples 43-45, wherein the object is a hand of a user; and wherein the instructions are further to play or cause to play, by the sensing module operating on the computing system, a sound corresponding to the determined location of the hand or the determined movement of the hand.

Example 47 may include one or more computer readable media of Example 46, wherein the determined movement is a tap.

Example 48 may include one or more computer readable media of Example 46, wherein to play or to cause to play a sound further comprises to play or cause to play a drum sound.

Example 49 may include one or more computer readable media of any Examples 43-45, wherein the object is a plurality of limbs of a user; and wherein the instructions are further to determine, by the sensing module operating on the computing system, based on the received second signals, the location or movement of the one or more limbs of the user.

Example 50 may include one or more computer readable media of Example 44, wherein the instructions are further to determine, by the sensing module operating on the computing system, a speed, velocity, acceleration, strike intensity, or strike rate of the one or more limbs of the user based upon the movement of the one or more limbs of the user.

Example 51 may include one or more computer readable media of Example 50, wherein a plurality of tags are affixed to respectively to the one or more limbs of the user; wherein each of the plurality of tags further includes an inertial measurement unit, IMU, sensor; and wherein the instructions are further to: receive, by the sensing module operating on the computing system, data from the IMU sensor; and output, by the sensing module operating on the computing system, the received the data from the IMU sensor.

Example 52 may include one or more computer readable media of Example 51, wherein the user is performing the sport of boxing.

Example 53 may include one or more computer readable media of any Examples 43-45, wherein the instructions are further to: determine, by the sensing module operating on the computing system, a navigation command based upon the determined location or the determined movement of the object with respect to the layer of material and a map; and send or cause to send, by the sensing module operating on the computing system, a navigation indication to the object.

Example 54 may include one or more computer readable media of Example 53, wherein the navigation indication is a location, a direction of movement, or a speed of movement.

Example 55 may include one or more computer readable media of Example 53, wherein the computing system is to guide the object through a predetermined path.

Example 56 may include one or more computer readable media of Example 53, wherein the layer of material is on a floor or on a ceiling.

Example 57 may include one or more computer readable media of Example 53, wherein the object is a human or a machine.

Example 58 may be an apparatus comprising: means for receiving, from a plurality of ultra-wide band, UWB, sensors within the layer of material, a plurality of second signals based upon a first UWB radio signal received from a tag affixed to the object; means for determining based upon the plurality of received second signals a location of the object or a movement of the object with respect to the layer of material; and means for outputting the determined location of the object or the determined movement of the object with respect to the layer of material.

Example 59 may include the apparatus of Example 58, wherein a tag affixed to the object is to send the first UWB radio signal.

Example 60 may include the method of Example 59, wherein the layer of material includes an overlay that visually indicates one or more locations with respect to the layer of material.

Example 61 may include the apparatus of any one of Examples 58-60, wherein the object is a hand of a user; and the apparatus further comprising means for playing or causing to play a sound corresponding to the determined location of the hand or the determined movement of the hand.

Example 62 may include the apparatus of Example 61, wherein the determined movement is a tap.

Example 63 may include the apparatus of Example 61, wherein playing or causing to play a sound comprises play or cause to play a drum sound.

Example 64 may include the apparatus of any one of Examples 58-60, wherein the object is a plurality of limbs of a user; and the apparatus further comprising means for determining, based on the received second signals, the location or movement of the one or more limbs of the user.

Example 65 may include the apparatus of Example 64, the apparatus further comprising means for determining a speed, velocity, acceleration, strike intensity, or strike rate of the one or more limbs of the user based upon the movement of the one or more limbs of the user.

Example 66 may include the apparatus of Example 64, wherein a plurality of tags are affixed to respectively to the one or more limbs of the user; wherein each of the plurality of tags further includes an inertial measurement unit, IMU, sensor; and the apparatus further comprising: means for receiving data from the IMU sensor; and means for outputting the received the data from the IMU sensor.

Example 67 may include the apparatus of Example 66, wherein the user is performing the sport of boxing.

Example 68 may include the apparatus of any one of Examples 58-60, further comprising: means for determining a navigation command based upon the determined location or the determined movement of the object with respect to the layer of material and a map; and means for sending or causing to send a navigation indication to the object.

Example 69 may include the apparatus of Example 68, wherein the navigation indication is a location, a direction of movement, or a speed of movement.

Example 70 may include the apparatus of Example 68, wherein the apparatus is to guide the object through a predetermined path.

Example 71 may include the apparatus of Example 68, wherein the layer of material is on a floor or on a ceiling.

Example 72 may include the apparatus of Example 68, wherein the object is a human or a machine.

What is claimed is:

1. An apparatus for sensing an object, comprising:
    a layer of material; and
    a plurality of ultra-wideband, UWB, radio sensors integrated within the layer of material at various locations, wherein individual UWB radio sensors are to:
        receive first signals, which are UWB radio signals transmitted from a device attached to an object within a sensing distance of the layer of material, and
        transmit second signals based on receipt of the first signals, wherein the second signals are used to determine by another device a location of the object relative to the layer of material.

2. The apparatus of claim 1, wherein the layer of material is flexible.

3. The apparatus of claim 1, wherein the layer of material is portable.

4. The apparatus of claim 1, wherein the layer of material is a carpet, and wherein the individual UWB radio sensors are embedded in the carpet.

5. The apparatus of claim 1, wherein a first UWB radio sensor of the plurality of UWB radio sensors includes a UWB radio antenna coupled with a receiver, wherein the first UWB radio sensor is a flexible circuit.

6. The apparatus of claim 1, wherein the plurality of UWB radio sensors are positioned within the layer of material in a grid pattern or in a radial pattern.

7. The apparatus of claim 1, wherein the second signal is transmitted via Wi-Fi, UWB radio, Bluetooth™, universal serial bus, USB, or Ethernet.

8. The apparatus of claim 1, wherein the device attached to the object further includes a tag attached to the object.

9. The apparatus of claim 1, wherein the plurality of UWB radio sensors are coupled to a UWB controller to receive multiple second signals from the plurality of UWB radio sensors.

10. The apparatus of claim 9, wherein the UWB controller is to determine the location of the object based upon the received multiple second signals from the plurality of UWB radio sensors.

11. The apparatus of claim 10, wherein to determine the location of the object is further to determine a position of the object as projected onto the layer of material.

12. The apparatus of claim 1, wherein the object is a plurality of objects.

13. A system for sensing an object, comprising:
one or more computer processors;
memory coupled to the one or more computer processors; and
a sensing module, to be loaded onto the memory and executed by the one or more processors, to sense an object relative to a plurality of ultra-wideband, UWB, radio sensors integrated within a layer of flexible material, wherein the plurality of UWB radio sensors receive a first UWB radio signal from the object; and
wherein the sensing module is to:
receive, from the plurality of UWB radio sensors, a plurality of second signals based upon the first UWB radio signal received by the UWB radio sensors;
determine, based upon the plurality of received second signals, a location of the object or a movement of the object with respect to the layer of material; and
output the determined location of the object or the determined movement of the object with respect to the layer of material.

14. The system of claim 13, wherein a tag affixed to the object is to send the first UWB radio signal.

15. The system of claim 13, wherein the object is a hand of a user; and
wherein the sensing module is further to play or cause to play a sound corresponding to the determined location of the hand or the determined movement of the hand.

16. A method for sensing an object relative to a flexible layer of material, comprising
receiving, by a computing system, from a plurality of ultra-wide band, UWB, radio sensors within the flexible layer of material, a plurality of second signals based upon a first UWB radio signal received from a tag affixed to the object;
determining, by the computing system, based upon the plurality of received second signals, a location of the object or a movement of the object with respect to the layer of material; and
outputting, by the computing system, the determined location of the object or the determined movement of the object with respect to the layer of material.

17. The method of claim 16, wherein a tag affixed to the object is to send the first UWB radio signal.

18. The method of claim 16, wherein the object is a hand of a user; and
wherein the method further comprises playing or causing to play, by the computing system, a sound corresponding to the determined location of the hand or the determined movement of the hand.

19. The method of claim 18, wherein the determined movement is a tap.

20. The method of claim 18, wherein playing or causing to play a sound comprises playing or causing to play a drum sound.

21. One or more computer-readable media comprising instructions that cause a computing device, in response to execution of the instructions by the computing device, to:
receive, by a sensing module operating on a computing system, from a plurality of ultra-wide band, UWB, radio sensors within a flexible layer of material, a plurality of second signals based upon a first UWB radio signal received by the UWB radio sensors;
determine, by the sensing module operating on the computing system, based upon the plurality of received second signals, a location of an object or a movement of the object with respect to the layer of material; and
output, by the sensing module operating on the computing system, the determined location of the object or the determined movement of the object with respect to the flexible layer of material.

22. The one or more computer-readable media of claim 21, wherein a tag affixed to the object is to send the first UWB radio signal.

23. The one or more computer-readable media of claim 21, wherein the object is a hand of a user; and
wherein the instructions are further to play or cause to play, by the sensing module operating on the computing system, a sound corresponding to the determined location of the hand or the determined movement of the hand.

24. The one or more computer-readable media of claim 23, wherein the determined movement is a tap.

25. The one or more computer-readable media of claim 23, wherein to play or to cause to play a sound further comprises to play or cause to play a drum sound.

* * * * *